United States Patent
Takeda et al.

(10) Patent No.: US 10,564,871 B2
(45) Date of Patent: Feb. 18, 2020

(54) MEMORY SYSTEM HAVING MULTIPLE DIFFERENT TYPE MEMORIES WITH VARIOUS DATA GRANULARITIES

(71) Applicant: TOSHIBA MEMORY CORPORATION, Tokyo (JP)

(72) Inventors: Susumu Takeda, Kanagawa (JP); Shinobu Fujita, Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 21 days.

(21) Appl. No.: 15/453,248

(22) Filed: Mar. 8, 2017

(65) Prior Publication Data
US 2018/0059980 A1 Mar. 1, 2018

(30) Foreign Application Priority Data
Aug. 25, 2016 (JP) ................................. 2016-164845

(51) Int. Cl.
*G06F 3/06* (2006.01)
*G06F 12/04* (2006.01)
*G06F 12/0802* (2016.01)

(52) U.S. Cl.
CPC .......... *G06F 3/0631* (2013.01); *G06F 3/0604* (2013.01); *G06F 3/0638* (2013.01); *G06F 3/0652* (2013.01); *G06F 3/0656* (2013.01); *G06F 3/0685* (2013.01); *G06F 12/04* (2013.01); *G06F 12/0802* (2013.01); *G06F 2212/60* (2013.01)

(58) Field of Classification Search
None
See application file for complete search history.

(56) References Cited

U.S. PATENT DOCUMENTS

| 8,028,119 | B2 | 9/2011 | Miura | |
|---|---|---|---|---|
| 8,930,647 | B1 | 1/2015 | Smith | |
| 2003/0154345 | A1* | 8/2003 | Lyon | G06F 12/0897 711/122 |
| 2013/0238856 | A1* | 9/2013 | Loh | G06F 12/0864 711/118 |

(Continued)

FOREIGN PATENT DOCUMENTS

JP 2006-323739 11/2006

OTHER PUBLICATIONS

Hybrid Cache Architecture with Disparate Memory Technologies Wu et al. pp. 34-45 (Year: 2009).*

(Continued)

*Primary Examiner* — Jared I Rutz
*Assistant Examiner* — Marwan Ayash
(74) *Attorney, Agent, or Firm* — Oblon, McClelland, Maier & Neustadt, L.L.P.

(57) ABSTRACT

A memory system has a first memory to store first-granularity data having a granularity smaller than second-granularity data, the first memory having a memory capacity smaller than a memory capacity of a second memory storing the second-granularity data, a controller to read third-granularity data having a granularity equal to or greater than the first-granularity from the data stored in the second memory, and a data extractor to extract the first-granularity data from the third-granularity data read by the controller and to store the extracted data in the first memory.

16 Claims, 14 Drawing Sheets

(56) References Cited

U.S. PATENT DOCUMENTS

| | | |
|---|---|---|
| 2014/0112082 A1 | 4/2014 | Lee et al. |
| 2014/0181415 A1* | 6/2014 | Loh .................... G06F 12/0862 |
| | | 711/137 |
| 2015/0074339 A1 | 3/2015 | Cheriton |

OTHER PUBLICATIONS

Gabriel H. Loh, "3D-Stacked Memory Architectures for Multi-Core Processors", International Symposium on Computer Architecture, IEEE, pp. 453-464. (2008).

Hideto Hidaka et al. "The Cache DRAM Architecture: A DRAM with an On-Chip Cache Memory", IEEE MICRO, pp. 14-25, (1990).

Stacey, R. (Jan. 2016). "11-15-0132-15-00ax-spec-framework," *Specification Framework for TGax*, pp. 1-43.

Stacey, R. (May 2016). "11-15-0132-17-00ax-spec-framework," *Specification Framework for TGax*, pp. 1-61.

* cited by examiner

MEMORY SYSTEM HAVING MULTIPLE DIFFERENT TYPE MEMORIES WITH VARIOUS DATA GRANULARITIES

CROSS REFERENCE TO RELATED APPLICATIONS

This application is based upon and claims the benefit of priority from the prior Japanese Patent Application No. 2016464845, filed on Aug. 25, 2016, the entire contents of which are incorporated herein by reference.

FIELD

Embodiments of the present invention relate to a memory system and a processor system.

BACKGROUND

With the spread of big data processing etc., demands for the increase in memory access speed and reduction in power consumption have been growing. The memory access speed greatly changes depending on the configuration of cache memories. The address requested an access is accessed again with high possibility, which is a property called temporal locality. Further, an address near the address requested an access is accessed with high possibility, which is a property called spatial locality. The temporal locality and spatial locality are in a trade-off relationship, and thus there is a likelihood that the spatial locality cannot be secured when emphasizing the temporal locality and the temporal locality cannot be secured when emphasizing the spatial locality.

DETAILED DESCRIPTION

Figure 1:
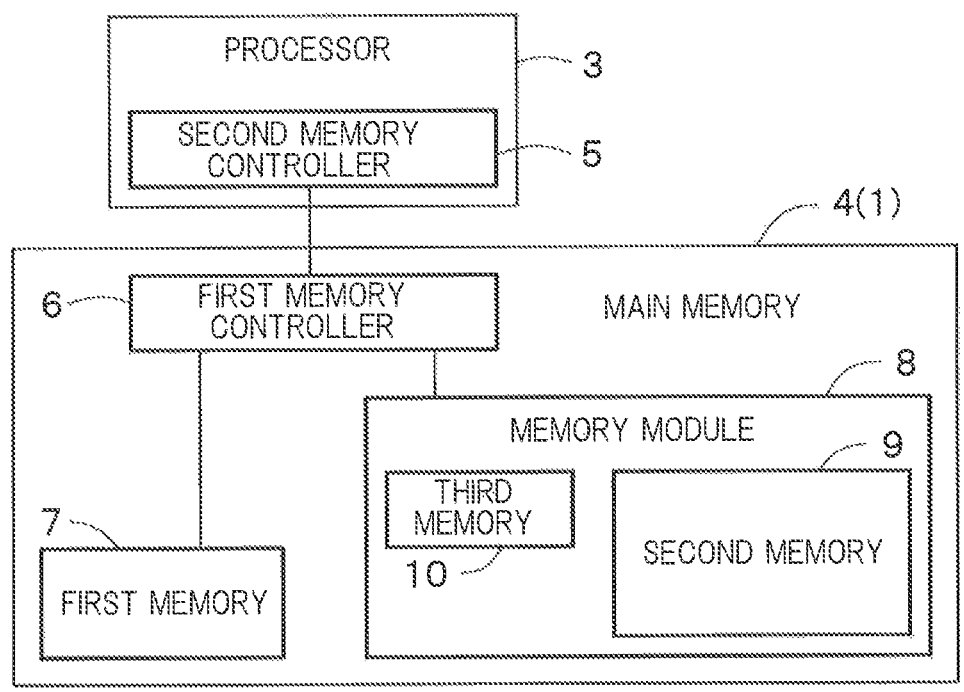
FIG. 1 is a block diagram showing a schematic structure of a processor system according to a first embodiment.

According to one embodiment, a memory system has a first memory to store first-granularity data having a granularity smaller than second-granularity data, the first memory having a memory capacity smaller than a memory capacity of a second memory storing the second-granularity data, a controller to read third-granularity data having a granularity equal to or greater than the first-granularity from the data stored in the second memory, and a data extractor to extract the first-granularity data from the third-granularity data read by the controller and to store the extracted data in the first memory.

Hereinafter, embodiments of the present invention will be explained referring to the drawings.

First Embodiment

FIG. 1 is a block diagram showing a schematic structure of a processor system 2 having a memory system 1 according to a first embodiment. The processor system 2 of FIG. 1 has a processor 3 and a main memory 4. The main memory 4 is included in at least a part of the memory system 1.

The processor 3 has a second memory controller 5. In addition to that, the processor 3 has a plurality of processor cores, cache memories, etc., but those are omitted in FIG. 1. The second memory controller 5 controls a first memory controller 6 in the main memory 4. More concretely, the second memory controller 5 controls the first memory controller 6 in accordance with an access request to the main memory 4.

In addition to the above first memory controller 6, the main memory 4 has a first memory 7 and a memory module 8. The first memory 7 is a nonvolatile memory such as an MRAM (Magnetoresistive Random Access Memory).

The memory module 8 may be removable to make memory capacity variable. The memory module 8 has a second memory 9 and a third memory 10. The second memory 9 is e.g. a DRAM (Dynamic Random Access Memory). The third memory 10 is e.g. an SRAM (Static Random Access Memory).

The second memory 9 stores second-granularity data. The first memory 7 has a memory capacity smaller than that of the second memory 9 for example, and stores first-granularity data. The third memory 10 has a memory capacity smaller than that of the first memory 7 for example, and stores third-granularity data.

Here, the word "granularity" means a line size of a cache and a page size of a general main memory (DRAM). For example, the second-granularity when accessing the second memory 9 is larger than the first-granularity when accessing the first memory 7. In this case, a page size having the second-granularity is larger than a line size having the first-granularity. Further, for example, the first-granularity as the line size of the first memory 7 is smaller than the third granularity as the page size of the third memory 10. In this case, the line size of the first memory 7 is smaller than the page size of the third memory 10. The magnitude relationship between the second-granularity and the third granularity can be arbitrarily determined. In the example explained below, the second-granularity and the third granularity are equal to each other.

As a concrete example, the memory module 8 stores data on a page size of several kilobytes as in a versatile DDR (Drouble-Data-Rate) SDRAM (Synchronous Dynamic Random Access Memory), and the first memory 7 stores data in increments of several tens of bytes. In the following, the memory module 8 has a page size of 1 kilobyte, and the first memory 7 has a data size of 64 bytes.

The access speed of the second memory 9, first memory 7 and third memory 10 can be arbitrarily determined, but typically, the access speed of the second memory 9 is lower than that of the first memory 7 and third memory 10. The access speed of the first memory 7 and that of the third memory 10 may be the same or different from each other.

Figure 2:
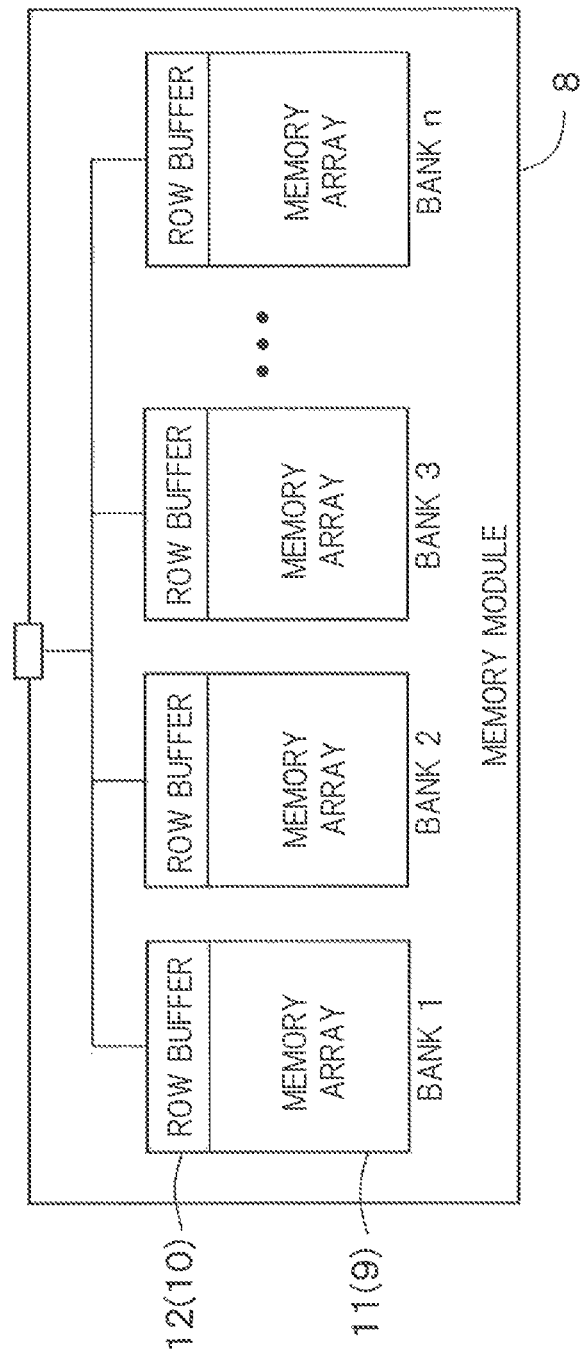
FIG. 2 is a block diagram showing an example of the internal structure of a memory module.

FIG. 2 is a block diagram showing an example of the internal structure of the memory module 8. The memory module 8 of FIG. 2 has a plurality of banks each having a memory array 11 and a row buffer 12. The memory array 11 is the above second memory 9, which is formed using e.g. a DRAM. The row buffer 12 is the above third memory 10, which is a memory such as an SRAM and a register operating at a higher speed than the memory array 11. The row buffer 12 stores the third-granularity data as stated above. The row buffer 12 stores a part of data stored in the memory array 11. For example, the row buffer 12 stores therein recently accessed data in the memory array 11 of its corresponding bank. Since the memory module 8 is accessed on a page basis, the row buffer 12 has a memory capacity equal to or greater than the page size. That is, the row buffer 12 stores data to be read/write from/in a plurality of memory cells in each word line of the memory array 11.

Figure 3:
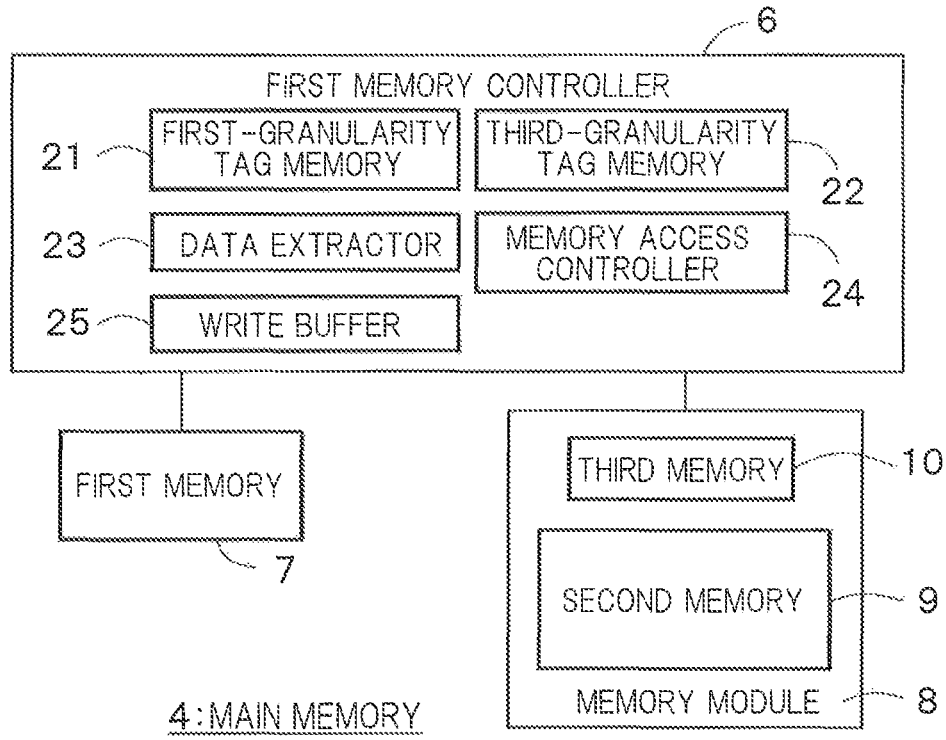
FIG. 3 is a block diagram showing an example of the internal structure of a main memory.

FIG. 3 is a block diagram showing an example of the internal structure of the main memory 4. As shown in FIG. 3, the first memory controller 6 has a first-granularity tag memory (second tag memory) 21, a third-granularity tag memory (first tag memory) 22, a data extractor 23, a memory access controller (controller) 24, and a write buffer (fourth memory) 25.

Figure 4:
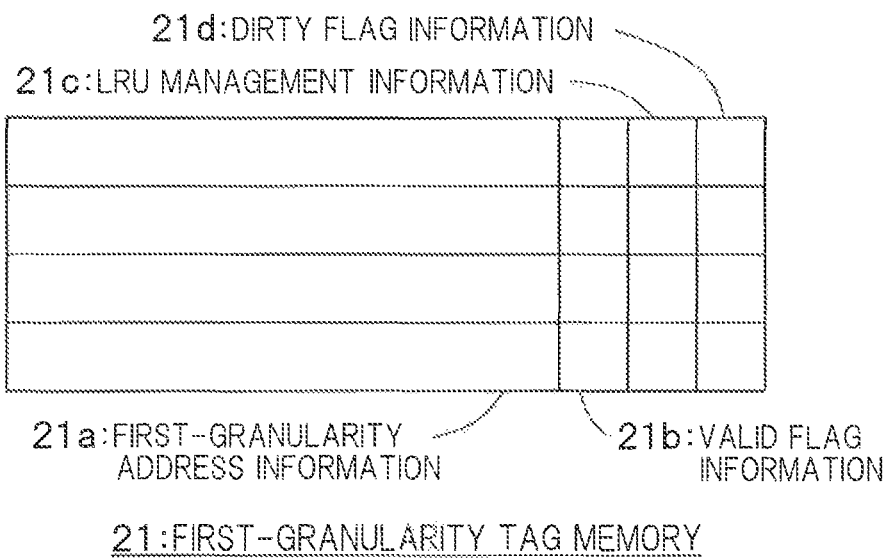
FIG. 4 is a diagram showing tag information about one set in a cache memory.

The first-granularity tag memory 21 stores address information etc. for specifying data in the first memory 7. FIG. 4 is a diagram showing a data structure of the first-granularity tag memory 21. As shown in FIG. 4, the first-granularity tag memory 21 stores first-granularity address information 21a, valid flag information 21b, LRU (Lease Recently Used) management information 21c, and dirty flag information 21d, which are associated with one another with respect to each entry. The address information has the number of bits of address capable of identifying e.g. 64-byte data.

The first-granularity tag memory 21 and first memory 7 function as e.g. a set-associative cache memory to manage write data in a write-back system, for example. The first-granularity tag memory 21 manages cache replacement based on LRU policy. FIG. 4 shows an example of tag information about one set in a 4-way set-associative cache memory.

The LRU management information 21c in the first-granularity tag memory 21 stores priority information to determine the data to be replaced. For example, in the case of the 4-way set-associative cache memory, numbers 0 to 3 are stored. For example, a smaller number is assigned to data as the data is accessed more recently. When replacing the data in the first memory 7, data having a numerical value of 3 is replaced.

The valid flag information 21b in the first-granularity tag memory 21 is flag information showing whether or not data corresponding to the address information is stored in the first memory 7. For example, if the data is stored, the valid flag information 21b is set to 1, and if not, the valid flag information 21b is set to 0. Whether desired data is stored in the first memory 7 can be judged by referring to the address information 21a and valid flag information 21b in the first-granularity tag memory 21. That is, when the first-granularity tag memory 21 stores the address information about desired data and the valid flag information corresponding thereto is set to 1, it can be judged that the data is stored in the first memory 7. The dirty flag information 21d is flag information showing whether or not data corresponding to the address information in the first-granularity tag memory 21 is written back to the second memory 9. For example, if not rewritten, the dirty flag information 21d is set to 0, and if rewritten, the dirty flag information 21d is set to 1.

Figure 5:
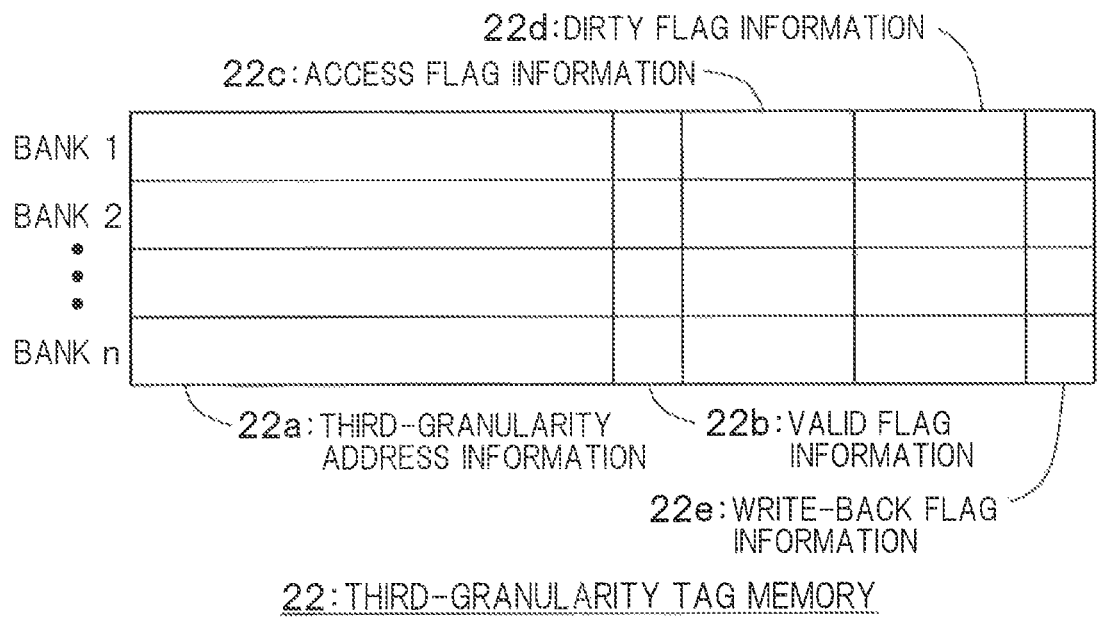
FIG. 5 is a diagram showing a data structure of a third-granularity tag memory.

The third-granularity tag memory 22 stores address information etc. for specifying data in the third memory 10. FIG. 5 is a diagram showing a data structure of the third-granularity tag memory 22. As shown in FIG. 5, the third-granularity tag memory 22 stores third-granularity address information 22a, valid flag information 22b, access flag information 22c, dirty flag information 22d, and a write-back flag information 22e, which are associated with one another with respect to each bank.

The third-granularity address information 22a is address information capable of identifying e.g. 1-kilobyte data. The valid flag information 22b is flag information showing whether or not data corresponding to the address information is stored in the third memory 10. For example, if the data is stored, the valid flag information 22b is set to 1, and if not, the valid flag information 22b is set to 0.

The access flag information 22c is flag information showing whether or not the corresponding data is accessed. The access flag information 22c stores whether or not the data in the first memory 7 is accessed on a first-granularity basis, for example. When the second memory 9 has a data granularity of 1 kilobyte and the first memory 7 has a data granularity of 64 bytes, the third-granularity tag memory 22 retains access flag information about 16 entries. For example, when 1-bit access flag information is provided with respect to each data item in the second memory 9, 16-bit access flag information is provided with respect to each entry in the third-granularity tag memory 22.

The dirty flag information 22d is flag information showing whether or not the corresponding data is rewritten. For example, the dirty flag information 22d is provided with respect to each first-granularity data item in the first memory 7. For example, when the second memory 9 has a second-granularity of 1 kilobyte and the first memory 7 has a first-granularity of 64 bytes, the dirty flag information 22d about 16 entries is retained. For example, when 1 bit is provided with respect to each data item in the second memory 9, 16-bit dirty flag information 22d is provided with respect to each entry in the third-granularity tag memory 22.

The write-back flag information 22e is flag information showing whether or not the corresponding data in the third memory 10 is written back to the second memory 9. The write buffer 25 is a memory temporarily storing, when storing new data in the first memory 7 upon receiving a read request from the processor 3, data to be erased from the first memory 7 when the data is rewritten (dirty flag is set to 1) and is not written back to the third memory 10 yet.

The memory access controller 24 controls access to the first memory 7 and memory module 8. That is, the memory access controller 24 performs control processes in the first memory controller 6 excepting the extraction process performed by the data extractor 23. More concretely, the memory access controller 24 reads third-granularity data having a granularity equal to or greater than the first-granularity from the data stored in the second memory 9. The data extractor 23 extracts first-granularity data from the third-granularity data read by the memory access controller 24, and stores the extracted data in the first memory 7.

Figure 6:
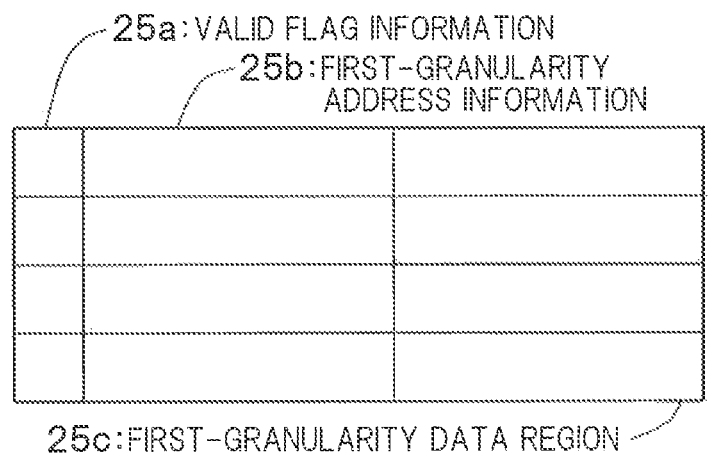
FIG. 6 is a diagram showing a data structure of a write buffer.

FIG. 6 is a diagram showing a data structure of the write buffer 25. As shown in FIG. 6, the write buffer 25 stores valid flag information 25a showing whether or not write-back to the third memory 10 in the memory module 8 is necessary, first-granularity address information 25b, and first-granularity data region 25c, which are associated with one another with respect to each entry. The write buffer 25 is e.g. a queue of FIFO (First-in-First-Out). For example, the valid flag information 25a set to 1 shows that data to be written back to the memory module 8, and the valid flag information 25a set to 0 shows invalid data.

Figure 7:
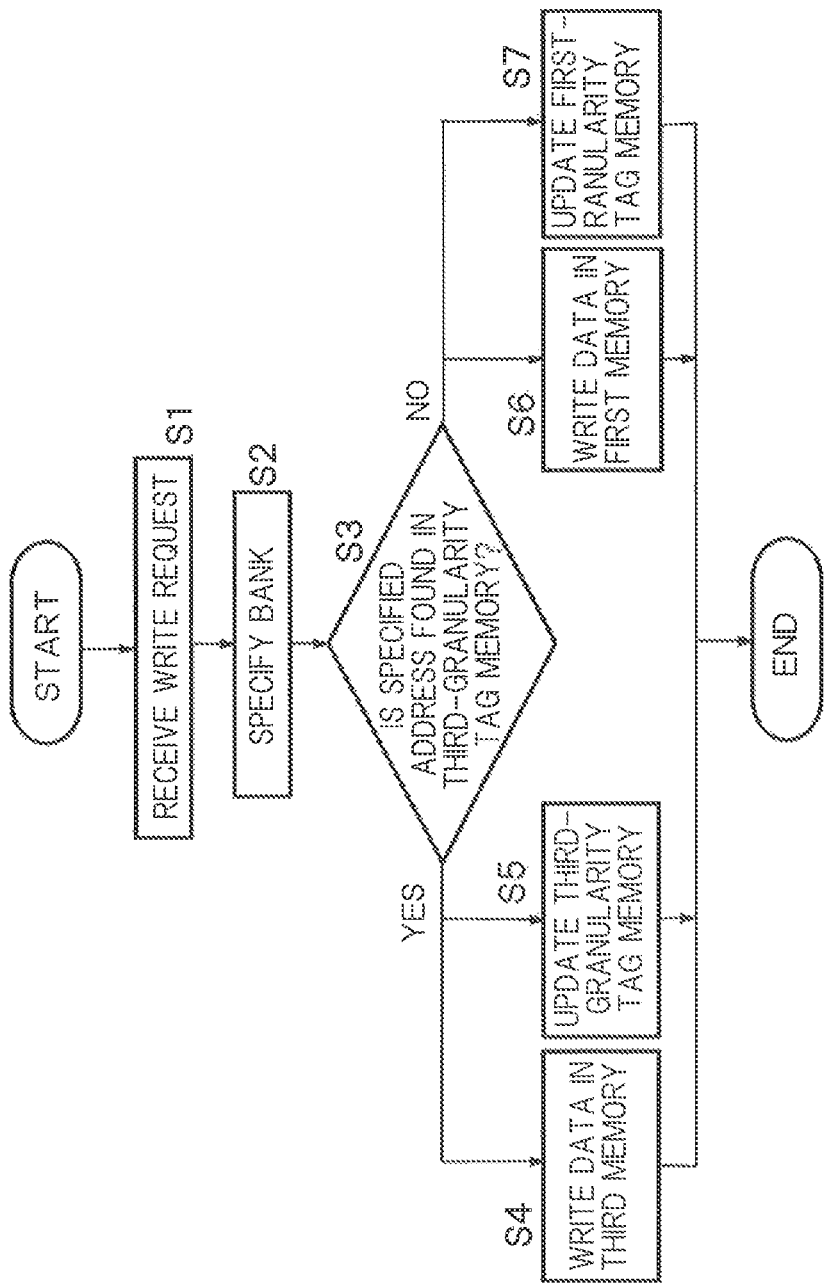
FIG. 7 is a flow chart showing the processing operation performed by a first memory controller when receiving a write request.

FIG. 7 is a flow chart showing the processing operation performed by the first memory controller 6 when receiving a write request from the processor 3. Note that the write process is not limited to the flow chart shown in FIG. 7. The first memory controller 6 receives e.g. a 64-byte burst write request from the second memory controller 5 (Step S1), and specifies a bank in the memory module 8 to write data therein (Step S2). Next, the first memory controller 5 judges whether the address specified in the write request is found in the third-granularity tag memory 22 corresponding to the specified bank (Step S3).

When the address is found in the third-granularity tag memory 22, the data corresponding to the write request is written in the third memory 10 (Step S4), and the access flag information 22c and dirty flag information 22d in the third-granularity tag memory 22 are updated (Step S5).

On the other hand, when the address is not found in the third-granularity tag memory 22 at Step S3, the data is written in the first memory 7 (Step S6), and the LRU management information 21c and dirty flag information 21d in the first-granularity tag memory 21 are updated (Step S7).

In this way, when a write request is made from the processor 3, if the corresponding address is found in the third-granularity tag memory 22, the data is written in the third memory 10, and if not found, the data is written in the first memory 7. When writing the data in the third memory 10, the access flag information 22c and dirty flag information 22d in the third-granularity tag memory 22 are updated. When writing the data in the first memory 7, the LRU management information 21c and dirty flag information 21d in the first-granularity tag memory 21 are updated.

Figure 8A:
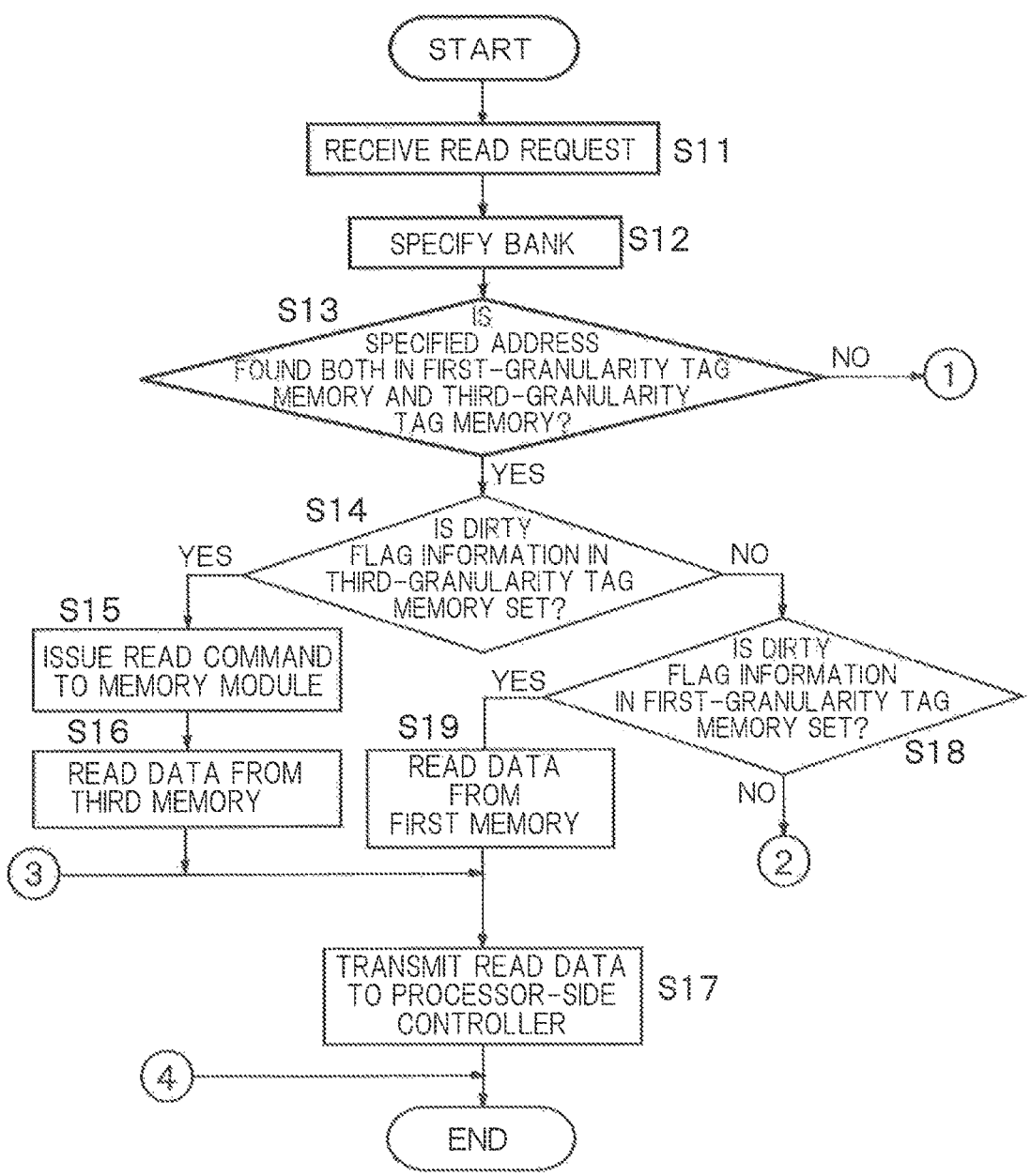
FIG. 8A is a flow chart showing a read process performed by the first memory controller when receiving a read request.
Figure 8B:
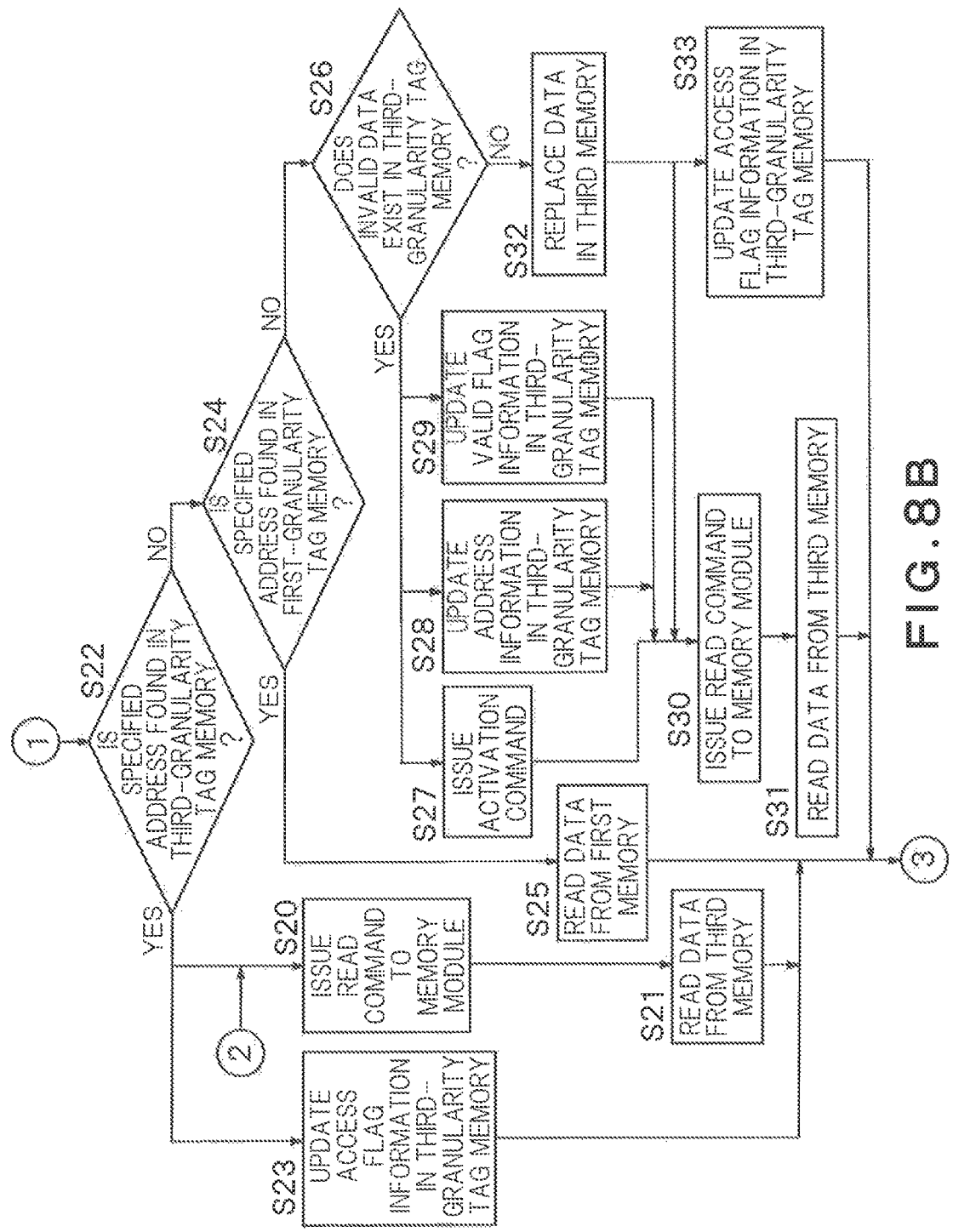
FIG. 8B is a flow chart following FIG. 8A.

Each of FIGS. 8A and 8B is a flow chart showing a read process performed by the first memory controller 6 when a read request is made from the processor 3. The read process differs depending on write policies. The read process shown in FIGS. 8A and 8B is based on the write policy of FIG. 7. Note that the read process is not limited to the flow charts shown in FIGS. 8A and 8B. Further, this example omits the case of reading data from the write buffer 25 as required in the configuration of FIG. 3, for simplification.

First, the first memory controller 6 receives e.g. a 64-byte burst read request from the second memory controller 5 (Step S11), and specifies a bank to read data therefrom (Step S12).

Next, the first memory controller 6 judges whether the address specified in the read request is found both in the first-granularity tag memory 21 and third-granularity tag memory 22 corresponding to the specified bank (Step S13).

When the address is found both in the first-granularity tag memory 21 and third-granularity tag memory 22, the first memory controller 6 judges whether the dirty flag information in the third-granularity tag memory 22 is set, namely whether the data corresponding to the specified address is not written back to the second memory 9 yet (Step S14).

When the dirty flag information is set, the first memory controller 6 issues a read command to the memory module 8 (Step S15), reads the data from the third memory 10 in the memory module 8 (Step S15), and transmits the read data to the second memory controller 5 (Step S17).

When the dirty flag information 22d in the third-granularity tag memory 22 is not set at Step S14, the first memory controller 6 judges whether the dirty flag information 21d in the first-granularity tag memory 21 is set (Step S18). When the dirty flag information 21d in the first-granularity tag memory 21 is set, the first memory controller 6 reads, from the first memory, the data corresponding to the address specified in the read request (Step S19), and transmits the read data to the second memory controller 5 (Step S17).

When the dirty flag information 21d in the first-granularity tag memory 21 is not set at Step S18, the first memory controller 6 issues a read command to the memory module 8 (Step S19). Then, the first memory controller 6 reads, from the third memory 10, the data corresponding to the address specified in the read request (Step S20), and transmits the read data to the second memory controller 5 (Step S16).

When the judgment at Step S13 is NO, the first memory controller 6 judges whether the address specified in the read request is found in the third-granularity tag memory 22 (Step S22). If found, the first memory controller 6 issues a read command to the memory module 8 (Step S20). Then, the first memory controller 6 reads, from the third memory 10, the data corresponding to the address specified in the read request (Step S21), transmits the read data to the second memory controller 5 (Step S17), and updates the access flag information 22c in the third-granularity tag memory 22 (Step S23).

If not found at Step S22, the first memory controller 6 judges whether the address specified in the read request is found in the first-granularity tag memory 21 (Step S24). If found, the first memory controller 6 reads, from the first memory 7, the data corresponding to the address specified in the read request (Step S25), and transmits the read data to the second memory controller 5 (Step S17).

If not found at Step S24, the first memory controller 6 performs a data fetch process on the memory module 8. First, the first memory controller 6 judges whether invalid data exists in the third-granularity tag memory 22 (Step S26). If the invalid data exists, the first memory controller 6 issues an activation command to read data from the second memory 9 and store it in the third memory 10 (Step S27), updates the address information in the third-granularity tag memory 22 (Step S28), and updates the valid flag information in the third-granularity tag memory 22 (Step S29). Steps S27 to S29 are performed in parallel. After performing the process of Steps S27 to S29, the first memory controller 6 issues a read command to the memory module 8 (Step S30), and reads the data from the third memory 10 (Step S31).

When no invalid data exists at Step S25, the first memory controller 6 replaces the data stored in the third memory 10 (Step S32). The replacement process at Step S32 will be mentioned in detail later. After performing the replacement process, the first memory controller 6 issues a read command to the memory module 8 (Step S30), transmits, to the second memory controller 5, data read from the third memory 10 in the memory module 8 (Step S31), and updates the access flag information in the third-granularity tag memory 22 (Step S33).

Figure 9:
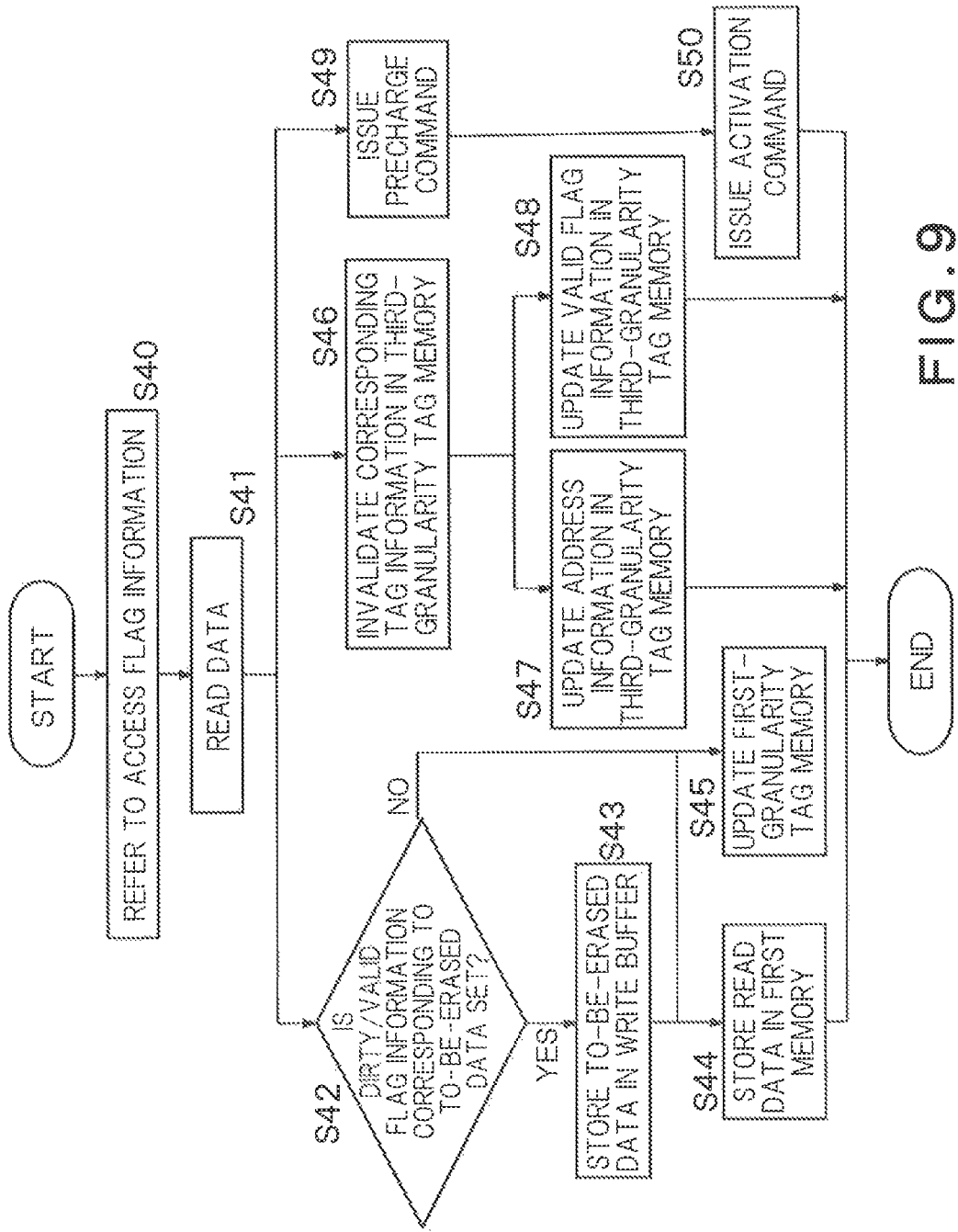
FIG. 9 is a detailed flow chart of a replacement process at Step S27 in FIG. 8B.

FIG. 9 is a detailed flow chart of the replacement process at Step S27 in FIG. 8B. First, the first memory controller 6 refers to the access flag information in the third-granularity tag memory 22 (Step S40), and reads data whose access flag information is set (Step S41). Next, the first memory controller 6 performs the following three processes (first to third processes) in parallel.

In the first process, the first memory controller 6 reads data to be erased from, the first memory 7, and judges whether dirty flag information and valid flag information corresponding to that data are set (Step S42). When these flag information are set, the data to be erased is erased after being stored in the write buffer 25 (Step S43). After that, the first memory controller 6 stores the data read from the third memory 10 at Step S50 in the first memory 7 (Step S44), and updates the first-granularity tag memory 21 (Step S45). By performing the process of Step S44, first-granularity data recently accessed is transferred from the third memory 10 to the first memory 7.

Note that when the data to be stored in the first memory 7 at Step S44 is already stored in the first memory 7, it is not necessary to store that data in the first memory 7 again. Further, even when the data to be stored is already stored in the first memory 7, the first memory 7 may be overwritten with that data if the data transferred from the third memory 10 to the first memory 7 is dirty.

In the second process, the first memory controller 6 updates the third-granularity tag memory 22. First, the first memory controller 6 invalidates the corresponding tag information in the third-granularity tag memory 22 (Step S46). Invalidated is an empty region in the third memory 10 in which the data transferred from the third memory 10 to the first memory 7 was stored. Next, the first memory controller 6 stores, in the third-granularity tag memory 22, the address information about the data to be stored in this empty region (Step S47), and updates the valid flag information in the third-granularity tag memory 22 (Step S48).

In the third process, the first memory controller 6 issues a precharge command to the memory module 8 (Step S49), and issues an activation command after the precharge is completed (Step S50). Accordingly, new data is read from the second memory 9 and stored in the above empty region in the third memory 10.

Figure 10:
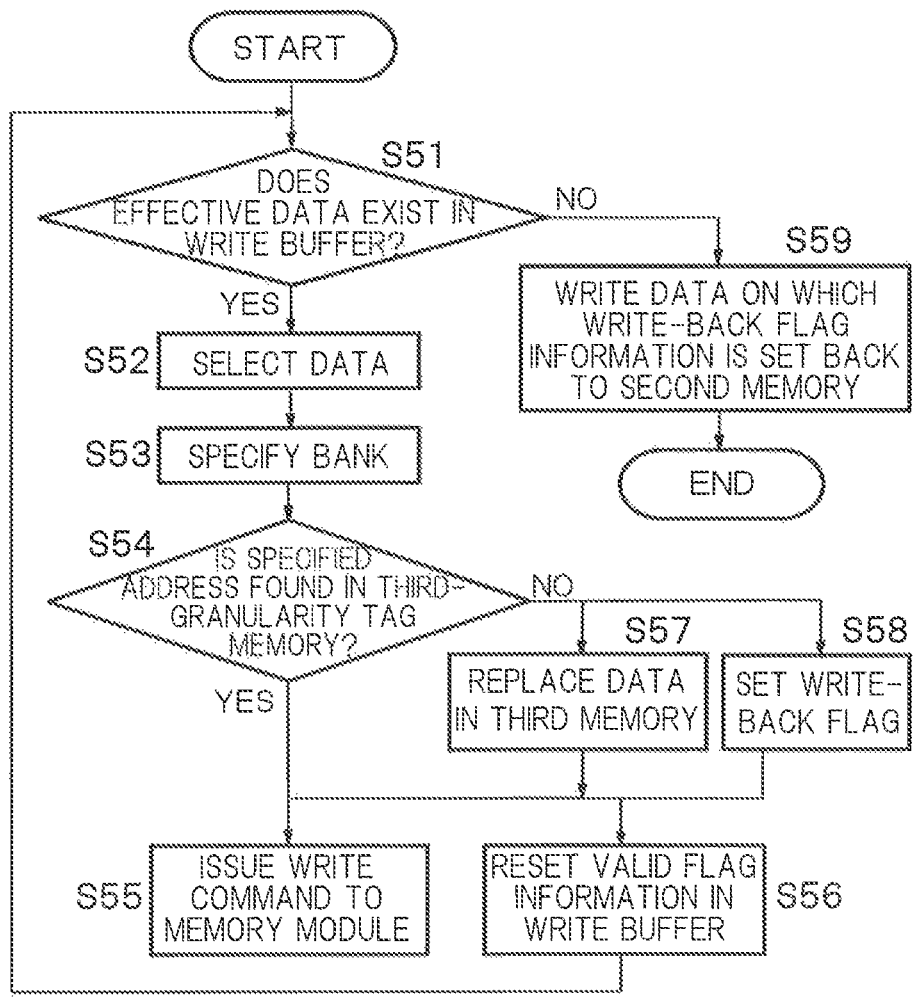
FIG. 10 is a flow chart of a process for writing data back from the buffer to the memory module.

FIG. 10 is flow chart of a process for writing data back from the write buffer 25 to the memory module 8. This write-back process may be performed at an arbitrary timing. For example, the write-back process may be performed at the timing when valid flag information about every entry in the write buffer 25 is set. Instead, the write-back process may be performed at predetermined intervals in synchronization with a dock cycle. Instead, the write-back process may be performed at the timing when the first memory controller 6 does not process any access request from the processor 3. In the following explanation, the write-back process is performed when the write buffer 25 includes an entry in which one or more piece of valid flag information 25a is set.

First, the first memory controller 6 judges whether effective data exists in the write buffer 25 (Step S51). Here, the first memory controller 6 judges whether the valid flag information 25a is set in the write buffer 25 shown in FIG. 6. Then, if there is an entry in which the valid flag information 25a is set, the first memory controller 6 selects the data of this entry (Step S52), and specifies a bank having the selected data in the memory module 8 (Step S53).

Next, the first memory controller 6 refers to the third-granularity tag memory 22 and judges whether the address corresponding to the specified bank is found therein (Step S54). If found in the third-granularity tag memory 22, the first memory controller 6 issues a write command to the memory module 8 (Step S55), and resets the valid flag information 25a in the write buffer 25 (Step S56). Accordingly, the data in the write buffer 25 is written in the third memory 10.

If not found at Step S54, the first memory controller 6 performs the replacement process of FIG. 9 on the third memory 10 (Step S57), and sets the write-back flag information 22e in the third-granularity tag memory 22 corresponding to the replaced data (Step S58). Next, the first memory controller 6 issues a write command to the memory module 8 (Step S55), and resets the valid flag information 25a in the write buffer 25 (Step S56). Accordingly, data in the write buffer 25 is stored in the storage location of the data evicted from the third memory 10, and the write-back flag information 22e in the third-granularity tag memory 22 is set.

The above process is performed on every entry in which the valid flag information 25a in the write buffer 25 is set. When the entry in which the valid flag information 25a in the write buffer 25 is set does not exist any more, the first memory controller 6 refers to the third-granularity tag memory 22, issues a precharge command to a bank on which the write-back flag information 22e is set, and invalidates the corresponding third-granularity tag memory 22 (Step S59). Accordingly, the data on which the write-back flag information 22e is set is written back to the second memory 9.

In this way, in the first embodiment, the first to third memories 10 are provided in the main memory 4 so that at least a part of data stored in the second memory 9 with the second-granularity is stored in the third memory 10 with the third granularity, and at least a part of data stored in the third memory 10 with the third-granularity is stored in the first memory 7 with the first-granularity equal to or less than the third granularity. Accordingly, data having spatial locality can be accessed at high speed by the third memory 10. In addition, data having temporal locality can be stored in the first memory 7 with a fine granularity, and the data having temporal locality can be accessed at high speed by the first memory. It is expected that both of data having spatial locality and data having temporal locality can be accessed at high speed, and the speed of access to the main memory 4 can be increased.

Second Embodiment

Figure 11:
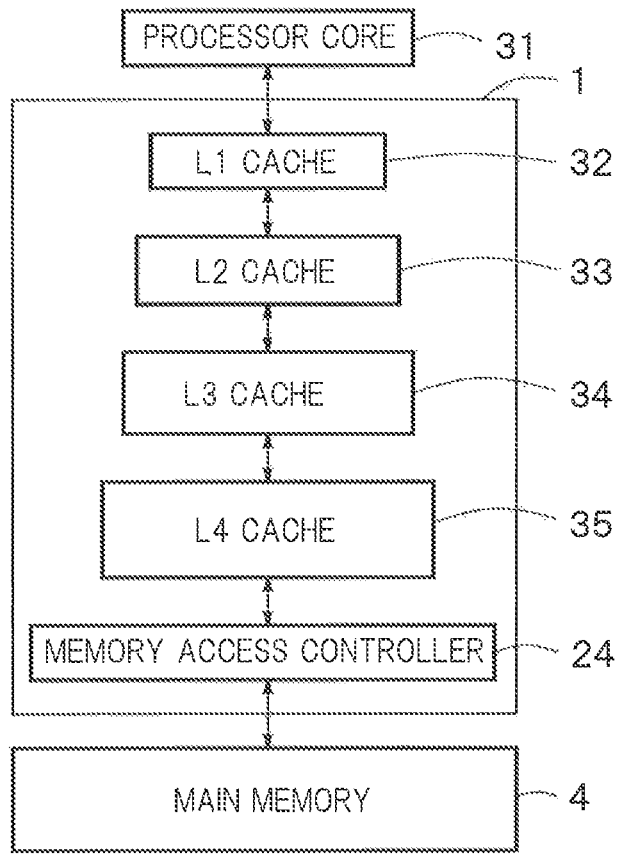
FIG. 11 is a block diagram showing a schematic structure of the processor system according to a second embodiment.

FIG. 11 is a block diagram showing a schematic structure of the processor system 2 having the memory system 1 according to a second embodiment. The processor system 2 of FIG. 11 has a processor core 31 and the memory system 1. The memory system 1 has a primary cache memory (hereinafter referred to as L1 cache) 32, a secondary cache memory (hereinafter referred to as L2 cache) 33, a tertiary cache memory (hereinafter referred to as L3 cache) 34, a quaternary cache memory (hereinafter referred to as L4 cache) 35, and the memory access controller 24. In FIG. 11, the main memory 4 is connected to the memory system 1, but the main memory 4 may be provided in the memory system 1.

The L1 cache 32 is connected to the processor core 31 and the L2 cache 33. The L2 cache 33 is connected to the L1 cache 32 and the L3 cache 34. The L3 cache 34 is connected to the L2 cache 33 and the L4 cache 35. The memory access controller 24 is connected to the L4 cache 35.

Each of the L1-L4 caches 32 to 35 stores at least a part of data stored in the main memory 4 or to be stored in the main memory 4. Each of the L1-L4 caches 32 to 35 has a tag part retaining address information capable of identifying the data retained therein. The tag part may be formed using a dedicated memory area. Instead, the tag part may be formed using a part of memory area retaining data. In this way, the internal structure of the L1 cache 32 and L2 cache 33 can be arbitrarily determined.

In the example shown in FIG. 11, the L1-L4 cache memories 32 to 35 at four levels are provided, but the number of hierarchy levels of the cache memories can be arbitrarily determined.

In FIG. 11, the processor core 31 and L1-L4 caches 32 to 35 excepting the main memory 4 may be integrated on one chip, or may be mounted separately on a plurality of chips. When these components are mounted separately on a plurality of chips, the chips may be directly joined through metal wiring.

In addition to the L1-L4 caches 32 to 35, the memory system 1 of FIG. 11 has the main memory 4. The main memory 4 may be mounted on the same chip or substrate as the L1-L4 caches 32 to 35, or may be mounted on a chip or a substrate different from the L1-L4 caches 32 to 35. Further, it is possible to integrate the processor core 31 and L1 cache 32 on one chip while integrating the L2-L4 caches 33 to 35 on another chip. In this way, the L1-L4 caches 32 to 35 in the memory system 1 and the main memory 4 can be arbitrarily implemented.

The L1-L4 caches 32 to 35 are formed using semiconductor memories which can be accessed at higher speed compared to the main memory 4. There are various variations in the policies for arranging data in each cache. For example, there is an inclusion system. In the inclusion system, the L2 cache 33 stores all the data stored in the L1 cache 32. Similarly, the L3 cache 34 stores all the data stored in the L2 cache 33, and the L4 cache 35 stores all the data stored in the L3 cache 34.

Further, there is an exclusion system, for example. In this system, for example, the data arranged in the L1 cache 32 and that arranged in the L2 cache 33 are not the same. Further, there is a hybrid system of the inclusion system and exclusion system, for example. In this system, for example, the data retained by the L1 cache 32 and that retained by the L2 cache 33 partially overlap with each other and partially have an exclusive relationship.

These systems concern the policies for arranging data in the L1-L4 caches 32 to 35, and various combinations are available in a configuration having a plurality of levels of caches. For example, the inclusion system may be employed in all levels of caches. For example, the exclusion system may be employed in the L1 cache 32 and L2 cache 33 with the inclusion system being employed in the L4 cache 35 and main memory 4. The systems shown in the present embodiment can be combined with the above various data arrangement policies.

There are also various systems for updating the caches, and the present embodiment can be combined with all of the systems. For example, the writing system at the time of cache write hit may be write-through or may be write-back. Further, the writing system at the time of cache write miss may be write-allocate or may be no-write-allocate.

The memory capacity of the L4 cache 35 is equal to or greater than that of the L3 cache 34. In this way, the cache memory at a higher level has a larger memory capacity. Therefore, it is desirable to use a highly integrated memory having less leakage power, which is frequently in proportion to the memory capacity, as the cache memory at a higher level. As such a memory, a nonvolatile memory such as an MRAM (Magnetoresistive Random Access Memory) is available. Further, an SRAM or a DRAM using low leakage power processing may be used, for example.

The main memory 4, which has a memory capacity larger than that of the L1-L4 caches 32 to 35, is frequently formed on one or more chips separated from the chip on which the processor core 31 etc. are mounted. Memory cells in the main memory 4 are e.g. DRAM (Dynamic RAM) cells. Note that the main memory 4 may be mounted on the same chip as the processor core 31 etc, by using a technique of TSV (Through Silicon Via) etc.

A physical address corresponding to a virtual address issued by the processor core 31 is first transmitted to the L1 cache 32 given the highest priority. When the data corresponding to this physical address (hereinafter referred to as target data) is stored in the L1 cache 32, the processor core 31 accesses that data. The L1 cache 32 has a memory capacity of about several tens of kilobytes, for example.

When the target data is not stored in the L1 cache 32, the corresponding physical address is transmitted to the L2 cache 33. When the target data is stored in the L2 cache 33, the processor core 31 accesses that data. The L2 cache 33 has a memory capacity of about several hundreds of kilobytes to several megabytes, for example. Similarly, when the target data is not stored in the L2 cache 32, the processor core 31 accesses the L3 cache 33, and when the target data is not stored also in the L3 cache 33, the processor core 31 accesses the L4 cache 34.

When the target data is not stored also in the L4 cache 35, the corresponding physical address is transmitted to the main memory 4. In the present embodiment, the main memory 4 stores all the data stored in the L4 cache 35. The present embodiment is not limited to the above policies for arranging data in the caches. The main memory 4 stores data on a page basis. Generally, the page-based data is arranged in the main memory 4 and an auxiliary memory device, but the present embodiment is based on an assumption that all the data is arranged in the main memory 4, for simplification. In the present embodiment, when the main memory 4 stores the target data, the processor core 31 accesses that data. The main memory 4 has a memory capacity of about several giga bytes, for example.

In this way, the L1-L4 caches 32 to 35 are arranged in a hierarchy, and the cache memory has a larger memory capacity as its order becomes larger (as its hierarchy level becomes lower).

The following explanation is based on an assumption that tag arrays of the L1-L4 caches 32 to 35 are managed based on LRU (Least Recently Used) algorithm, for simplification. Note that the present embodiment can be combined with various types of algorithm for managing data priority other than LRU. For example, that the present embodiment may be combined with NRU (Not Recently Used) or random replacement algorithm. Further, in the following explanation, the tag array is shown as a fully associative cache, for simplification. Note that the present embodiment can be applied to various cache systems such as a set associative system and a direct mapping system.

The processor system 2 of FIG. 11 has the processor core 31 and four levels of caches. The processor system 2 of FIG. 11 is connected to the main memory 4 through an interface such as DDR. The main memory 4 has a data granularity of 1 kilobyte, for example. The main memory 4 has a row buffer (not shown), and the row buffer has a memory capacity of at least the data granularity of the main memory 4. The main memory 4 is formed using e.g. a DRAM. The L1-L3 caches 32 to 34 have a data granularity of 64 bytes, for example.

Figure 12:
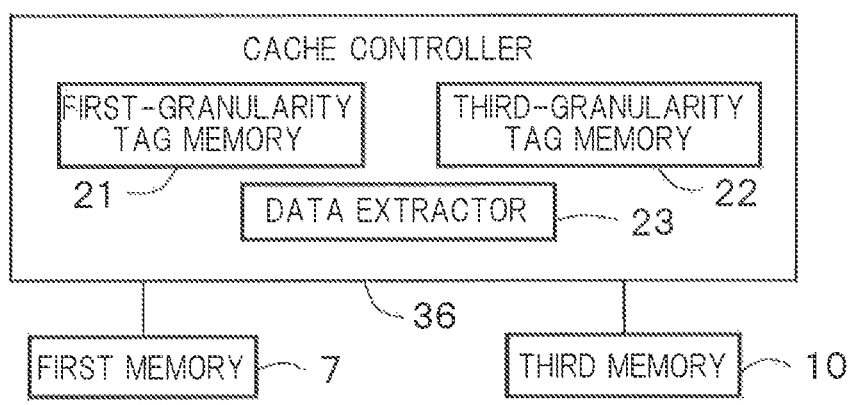
FIG. 12 is a block diagram showing an example of the internal structure of an L4 cache.

FIG. 12 is a block diagram showing an example of the internal structure of the L4 cache 35. As shown in FIG. 12, the L4 cache 35 has the first memory 7, the third memory 10, and a cache controller 36.

The memory capacity of the first memory 7 is larger than that of the third memory 10. The first memory 7 reads/writes data with the first-granularity. The third memory 10 reads/writes data with the third granularity larger than the first-granularity. For example, the first-granularity is set to 64 bytes, and the third granularity is set to 1 kilobyte. The first memory 7 is formed using e.g. an and the third memory 10 is formed using e.g. an SRAM.

The cache controller 36 has the first-granularity tag memory 21, the third-granularity tag memory 22, and the data extractor 23. The first-granularity tag memory 21 stores information capable of identifying data stored in the first memory 7. The third-granularity tag memory 22 stores information capable of identifying data stored in the third memory 10. The data extractor 23 reads data in the third memory 10, and writes it in the first memory 7 with the first-granularity.

Figure 13:
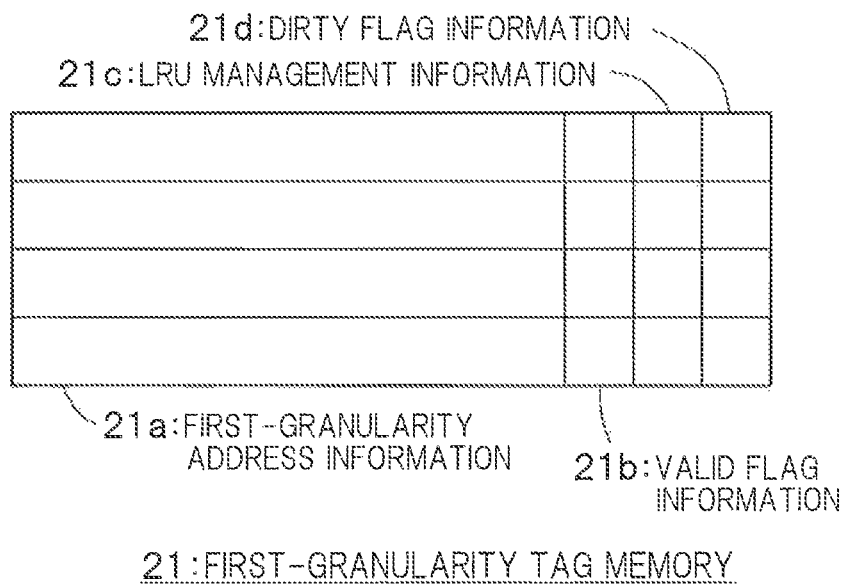
FIG. 13 is a diagram showing an example of the data structure of a first-granularity tag memory.

FIG. 13 is a diagram showing an example of the data structure of the first-granularity tag memory 21. Similarly to FIG. 4, the first-granularity tag memory 21 of FIG. 13 stores first-granularity address information 21a, valid flag information 21b, LRU (Lease Recently Used) management information 21c, and dirty flag information 21d, which are associated with one another with respect to each entry.

Figure 14:
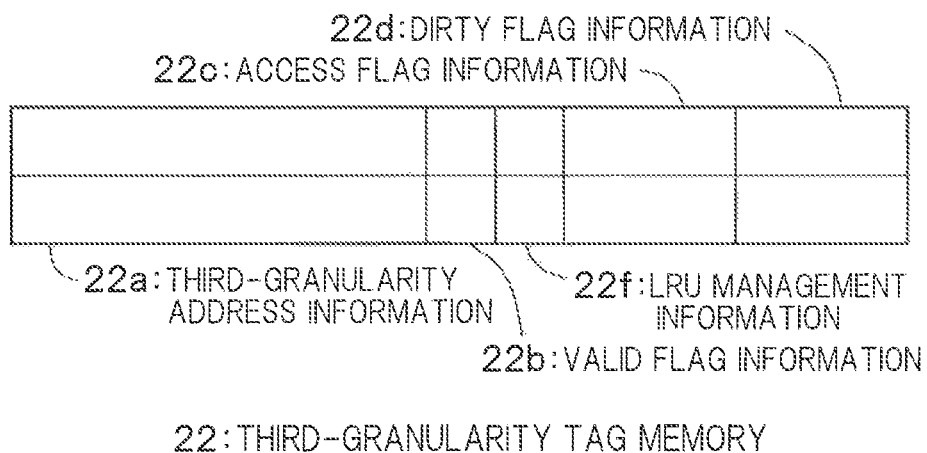
FIG. 14 is a diagram showing an example of the data structure of the third-granularity tag memory.

FIG. 14 is a diagram showing an example of the data structure of the third-granularity tag memory 22. The third-granularity tag memory 22 of FIG. 14 stores the third-granularity address information 22a, the valid flag information 22b, the LRU management information 22f, the access flag information 22c, and the dirty flag information 22d, which are associated with one another with respect to each entry.

Figure 15:
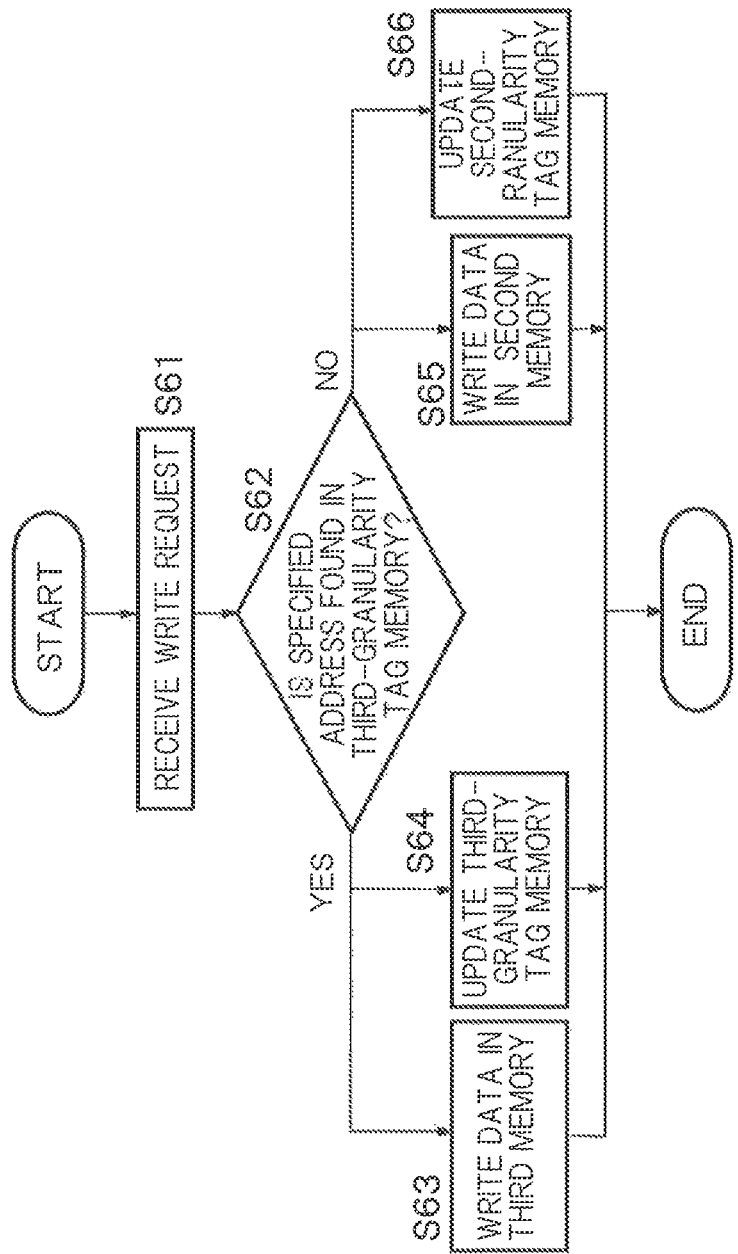
FIG. 15 is a flow chart of a write process for the L4 cache.

FIG. 15 is a flow chart of a write process for the L4 cache 35. In the write process for the L4 cache 35, of the data in the L3 cache 34 for example, data on which the dirty flag information is set is written back. A write request for 64-byte data is transmitted from the L3 cache 34 to the L4 cache 35.

When receiving a write request to the L4 cache 35 (Step S61), the cache controller 36 accesses the third-granularity tag memory 22, and judges whether the specified address is found in the third-granularity tag memory 22 (Step S62). When the address is found in the third-granularity tag memory 22, the data corresponding to the write request is written in the third memory 10 (Step S63), and the access flag information 22c and dirty flag information 22d in the third-granularity tag memory 22 are updated (Step S64).

On the other hand, when the address is not found in the third-granularity tag memory 22 at Step S62, the data corresponding to the address is written in the first memory 7 (Step S65), and the LRU management information 21c and dirty flag information 21d in the first-granularity tag memory 21 are updated (Step S66).

Note that the write process for the L4 cache 35 may be based on an operating procedure different from FIG. 15. For example, the data may be written both in the first memory 7 and third memory 10.

Figure 16A:
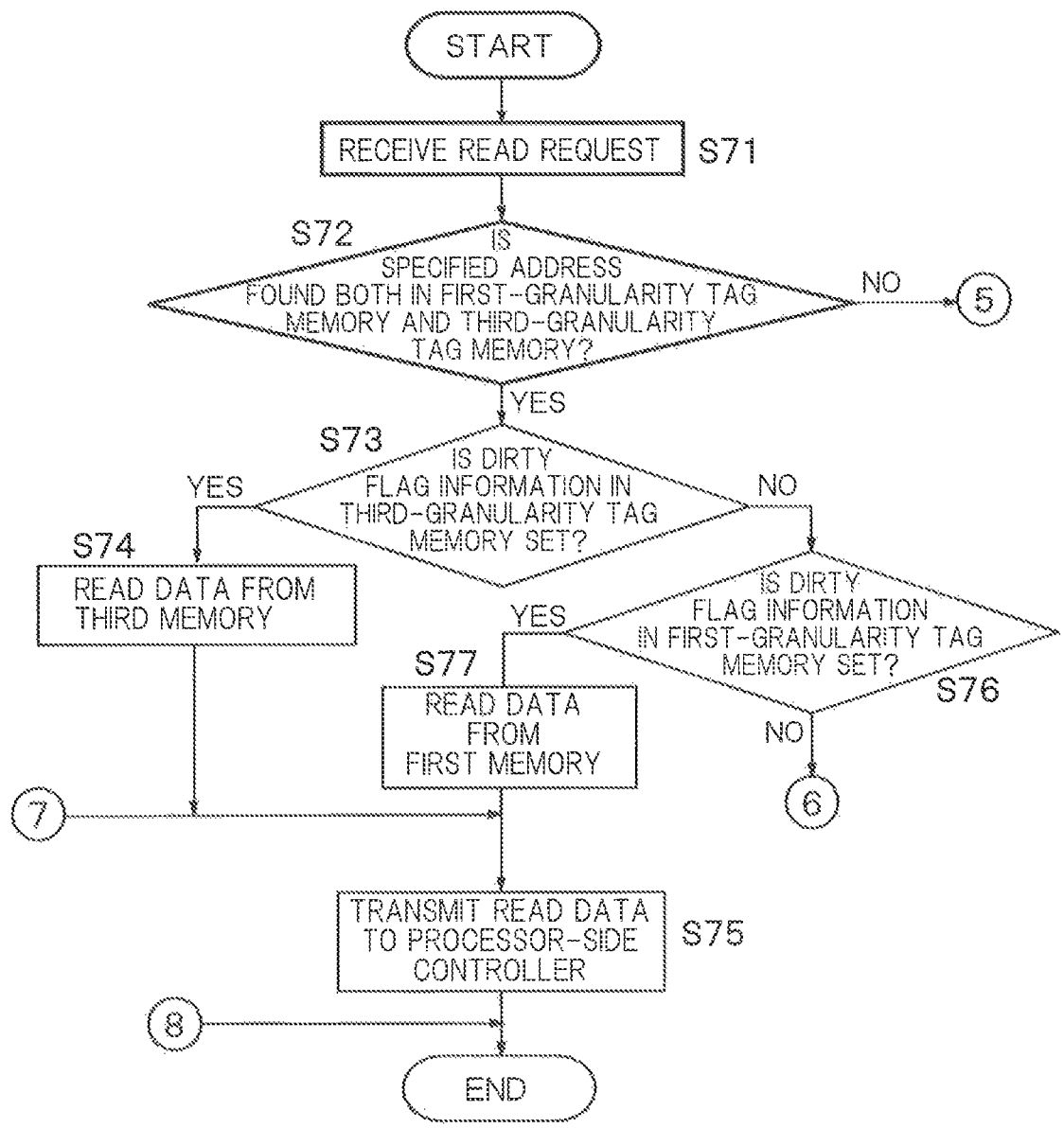
FIG. 16A is a flow chart showing a read process for the L4 cache and a data fetch process when the L4 cache fails to cache.
Figure 16B:
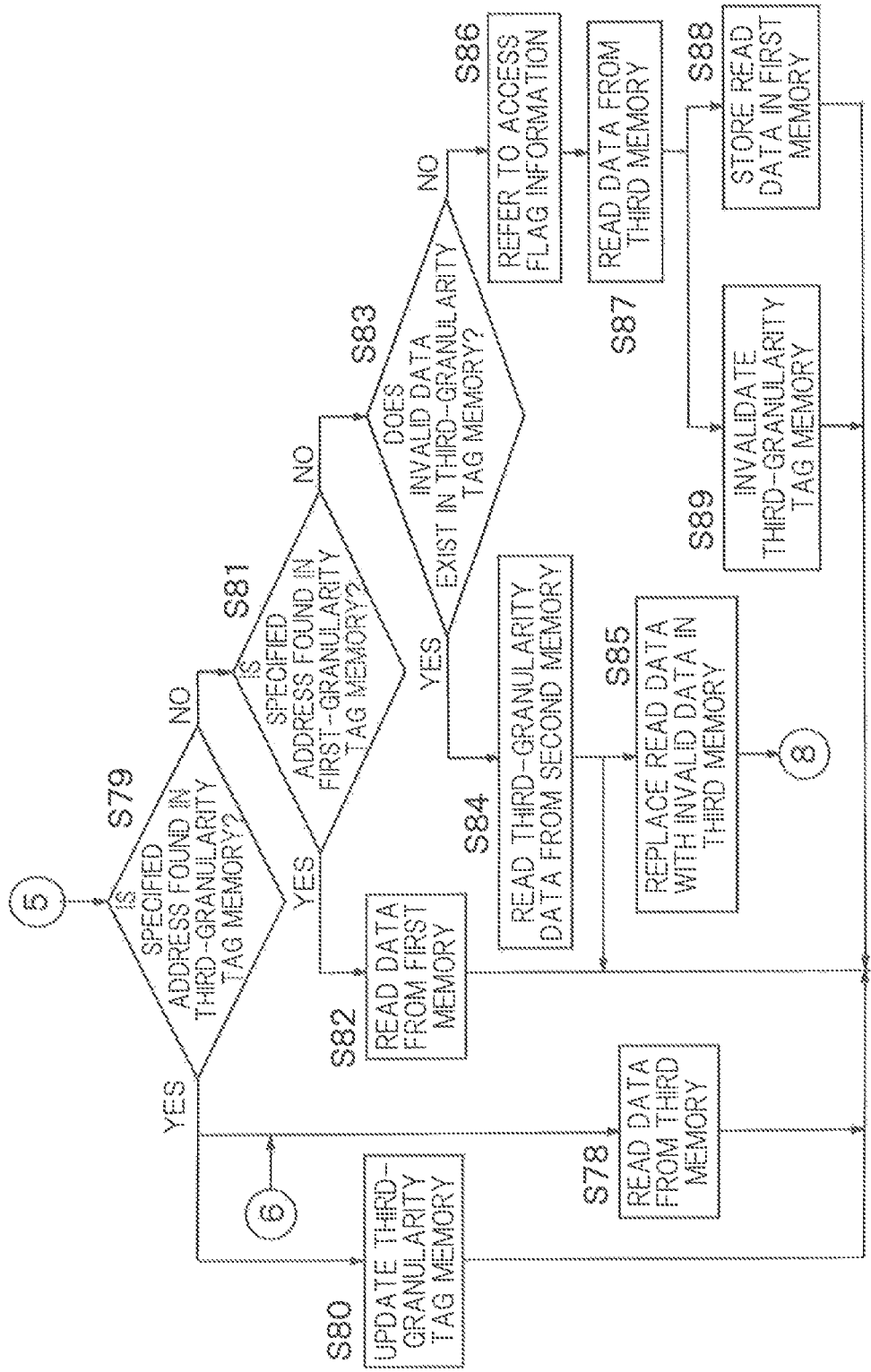
FIG. 16B is a flow chart following FIG. 16A.

Each of FIGS. 16A and 16B is a flow chart showing a read process for the L4 cache 35 and a data fetch process performed when the L4 cache 35 fails to cache. The read process for the L4 cache 35 is performed when e.g. the L3 cache 34 fails to cache, and a read request for 64-byte data is transmitted from the L3 cache 34 to the L4 cache 35.

Note that the read process differs depending on write policies. In the following, the read process when the write policy of FIG. 14 is employed will be explained, but the read process is not limited to the following explanation.

When receiving a read request to the L4 cache 35 (Step S71), the cache controller 36 judges whether the specified address is found both in the first-granularity tag memory 21 and third-granularity tag memory 22 (Step S72). If found in both memories, the cache controller 36 judges whether the dirty flag information in the third-granularity tag memory 22 is set (Step S73). When the dirty flag information 22d in the third-granularity tag memory 22 is set, the cache controller 36 reads the data specified in the read request from the third memory 10 (Step S74). The read data is transmitted to the L3 cache 34 (Step S75).

When the dirty flag information 22d in the third-granularity tag memory 22 is not set, the cache controller 36 judges whether the dirty flag information 21d in the first-granularity tag memory 21 is set (Step S76). When the dirty flag information 21d in the first-granularity tag memory 21 is set, the cache controller 36 reads the data specified in the read request from the first memory 7 (Step S77), and transmits it to the L3 cache 34 (Step S75). When the dirty flag information 21d in the first-granularity tag memory 21 is not set, the cache controller 36 reads the data specified in the read request from the third memory 10 (Step S78), and transmits it to the L3 cache 34 (Step S75).

In this way, when the specified address is found both in the first-granularity tag memory 21 and third-granularity tag memory 22, the cache controller 36 reads the data specified in the read request from the first memory 7 or third memory 10, based on the dirty flag information 21d and 22d in the first-granularity tag memory 21 and third-granularity tag memory 22.

If not found at Step S72, the cache controller 36 judges whether the address specified in the read request is found in the third-granularity tag memory 22 (Step S79). If found, the cache controller 36 reads the data specified in the read request from the third memory 10 (Step S78), and updates the third-granularity tag memory 22 (Step S80). Here, an access flag corresponding to the data read from the third memory 10 is set.

If not found at Step S79, the cache controller 36 judges whether the specified address is found in the first-granularity tag memory 21 (Step S81). If found in the first-granularity tag memory 21, the cache controller 36 reads the data specified in the read request from the first memory 7 (Step S82), and transmits it to the L3 cache 34 (Step S75).

If not found at Step S81, a data fetch process for the L4 cache 35 is performed. First, the cache controller 36 judges whether invalid data exists in the third-granularity tag memory 22 (Step S83). If invalid data exists, the cache controller 36 reads third-granularity data from the second memory 9 (Step S84), and replaces the read data with the invalid data in the third memory 10 (Step S85). Further, the cache controller 36 transmits 64-byte data in the read data to the L3 cache 34 (Step S75).

When no invalid data exists Step S83, the cache controller 36 performs an invalidation process for the third memory 10, and transfers data from the third memory 10 to the first memory 7 correspondingly to the invalidation process. First, the cache controller 36 accesses the third-granularity tag memory 22, and refers to the access flag information 22c about the data to be invalidated (Step S86). The data extractor 23 extracts, from the third memory 10, first-granularity data on which the access flag information 22c is set (Step S87), and stores it in the first memory 7 (Step S88). Further, the cache controller 36 invalidates the third-granularity tag memory 22 (Step S89). Next, the cache controller 36 reads data from the second memory 9, transmits the read data to the L3 cache 34 while storing the read data in the third memory 10, and sets the access flag information 22c in the third-granularity tag memory 22 corresponding to this data.

When the data to be stored in the first memory 7 already exists in the first memory 7, the process of storing that data may be omitted. Further, even when the data to be stored in the first memory 7 already exists in the first memory 7, the first memory 7 may be overwritten with that data if the data transferred from the third memory 10 to the first memory 7 is dirty.

In this way, in the second embodiment, the first memory 7 and third memory 10 are provided in the L4 cache 35 so that at least a part of data stored in the second memory 9 with the second-granularity is stored in the third memory 10 with the third granularity, and at least a part of data stored in the third memory 10 with the third-granularity is stored in the first memory 7 with the first-granularity equal to or less than the third granularity. Accordingly, data having spatial locality can be accessed at high speed by the third memory 10. In addition, data having temporal locality can be stored in the first memory 7 with a fine granularity, and the data having temporal locality can be accessed at high speed by the first memory 7. It is expected that both of data having spatial locality and data having temporal locality can be accessed by the L4 cache 35, and the hit rate of the L4 cache 35 can be improved. The improved hit rate of the L4 cache 35 can increase the memory access speed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A memory system comprising:
a first memory to store first-granularity data, the first memory having a memory capacity smaller than a memory capacity of a second memory storing second-granularity data, the first-granularity being smaller than the second granularity, the first memory being accessed at higher speed than the second memory;
a third memory to store third-granularity data having a granularity which is greater than the first-granularity and equal to the second-granularity;
a controller to read the third-granularity data from the data stored in the second memory, and store the read data in the third memory, the third memory being accessed at higher speed than the second memory;
a data extractor to extract accessed data in the data stored in the third memory and to store the extracted data in the first memory with the first-granularity;
a first tag memory to store address information specifying the third-granularity data stored in the third memory, and access information showing an access status of data; and
an access information updater to update the access information in the first tag memory when the third-granularity data is stored in the third memory,
wherein the first memory, the second memory, and the third memory are at a same hierarchy level, and
the data extractor stores at least a part of the data stored in the third memory in the first memory with the first-granularity, based on the access information in the first tag memory.

2. The memory system of claim 1, further comprising:
a second tag memory to store address information specifying the first-granularity data stored in the first memory, and dirty information showing whether or not the first-granularity data stored in the first memory is rewritten,
wherein the first tag memory stores dirty information showing whether or not the third-granularity data stored in the third memory is rewritten, and
when the controller receives a read request from a processor and an address specified in the read request is found in both of the first tag memory and the second tag memory, the controller reads data corresponding to the read request from the first memory or the third memory based on the dirty information in the second tag memory and the dirty information in the first tag memory.

3. The memory system of claim 1, further comprising:
a second tag memory to store address information specifying the first-granularity data stored in the first memory, and dirty information showing whether or not the first-granularity data stored in the first memory is rewritten,
wherein the data extractor stores at least a part of the data stored in the third memory in the first memory with the first-granularity, based on the dirty information.

4. The memory system of claim 1,
wherein the data extractor stores at least a part the data stored in the third memory in the first memory with the first-granularity in conformity to a timing when at least a part of the third-granularity data stored in the third memory is erased.

5. The memory system of claim 1,
wherein when the controller receives a read request from a processor and an address specified in the read request is not found in the first memory and the third memory, the controller reads data from the second memory.

6. The memory system of claim 1,
wherein when an address specified in a read request from a processor is not found in the first memory and the third memory, the controller replaces the data stored in the third memory.

7. The memory system of claim 6, further comprising:
a fourth memory to store valid data stored in the first memory and to be erased from the first memory when the address specified in the read request from the processor is not found in the first memory and the third memory,
wherein the controller stores the data stored in the fourth memory in the third memory.

8. The memory system of claim 7,
wherein when the address specified in the read request from the processor is not found in the first memory and the third memory, the controller transfers a part of data in the third memory to an empty region in the first memory obtained by storing data in the first memory in the fourth memory, and stores data in the second memory in an empty region in the third memory obtained by the transferring the part of the data.

9. The memory system of claim 1, further comprising:
a fourth memory to store valid data stored in the first memory and to be erased from the first memory when the address specified in the read request from the processor is not found in the first memory and the third memory,
wherein when an address corresponding to data in the fourth memory is not found in the first tag memory, the first tag memory stores write-back flag information showing that the data is written back to the third memory, and
the controller stores the data written back from the fourth memory to the third memory in the second memory, based on the write-back flag information.

10. The memory system of claim 1,
wherein when the controller receives a write request from a processor, if an address specified in the write request is found in the third memory, the controller writes data corresponding to the write request in the third memory, and if the address specified in the write request is not found in the third memory, the controller writes the data in the first memory.

11. The memory system of claim 1,
wherein the second memory is a DRAM (Dynamic Random Access Memory), and
the first memory is an MRAM (Magnetoresistive Random Access Memory).

12. The memory system of claim 1,
wherein the third memory is an MRAM or an SRAM (Static Random Access Memory).

13. The memory system of claim 1,
wherein the first memory, the second memory, and the third memory are cache memories having a higher access priority than a main memory.

14. The memory system of claim 1,
the second memory is a memory array, and the third memory is a row buffer storing data to be read/written from/in a plurality of memory cells in the memory array accessed on a word line basis.

15. A processor system comprising:
a processor;
a first memory to store first-granularity data;
a second memory to store a second-granularity data having a granularity larger than first-granularity data, the second memory having a memory capacity larger than a memory capacity of the first memory, the second memory being accessed at lower speed than the first memory;
a third memory to store third-granularity data having a granularity which is greater than the first-granularity and equal to the second-granularity, the third memory being accessed at higher speed than the second memory;
a controller to read third-granularity data having a granularity from the data stored in the second memory, and store the read data in the third memory;
a data extractor to extract accessed data in the data stored in the third memory and to store the extracted data in the first memory with the first-granularity;
a first tag memory to store address information specifying the third-granularity data stored in the third memory, and access information showing an access status of data; and
an access information updater to update the access information in the first tag memory when the third-granularity data is stored in the third memory,
wherein the first memory, the second memory, and the third memory are at a same hierarchy level, and
the data extractor stores at least a part of the data stored in the third memory in the first memory with the first-granularity, based on the access information in the first tag memory.

16. The processor of claim 15, further comprising:
a main memory comprising the first memory, the second memory and the third memory.

* * * * *